United States Patent [19]

Charles et al.

[11] Patent Number: 4,748,049
[45] Date of Patent: May 31, 1988

[54] CLEAR PAINT BOOTH COATING COMPOSITION AND METHOD

[75] Inventors: Harry R. Charles; Cathy D. Stewart, both of Sterling Heights, Mich.

[73] Assignee: Chemfil Corporation, Troy, Mich.

[21] Appl. No.: 845,107

[22] Filed: Mar. 27, 1986

[51] Int. Cl.$^4$ .............................................. B05D 5/08
[52] U.S. Cl. ................................. 427/156; 106/14.13; 106/14.15; 134/4; 252/390; 252/396; 427/154; 427/336; 427/421
[58] Field of Search ............... 427/156, 336, 154, 421; 106/14.13, 14.15; 252/390, 396; 134/4

[56] References Cited

U.S. PATENT DOCUMENTS

| | | | |
|---|---|---|---|
| 2,420,720 | 5/1947 | Pechukas et al. | 427/154 |
| 3,201,274 | 8/1965 | Hobbs | 427/156 |
| 3,202,554 | 8/1965 | Hornus | 427/156 |
| 3,696,498 | 10/1972 | Leontaritis et al. | 427/156 |
| 4,145,855 | 3/1979 | Sheldon | 427/156 |
| 4,169,088 | 9/1979 | Hansen | 427/156 |
| 4,200,671 | 4/1980 | Krajewski et al. | 427/336 |
| 4,287,103 | 9/1981 | Green | 524/47 |
| 4,456,731 | 6/1984 | Caporossi | 427/156 |
| 4,592,756 | 6/1986 | Kawasaki et al. | 106/22 |

FOREIGN PATENT DOCUMENTS 58-80301  5/1983  Japan .

*Primary Examiner*—Janyce A. Bell
*Attorney, Agent, or Firm*—Godfried R. Akorli

[57] ABSTRACT

A crystal clear paint spray booth barrier coating comprising an aqueous solution of polyvinyl alcohol is disclosed. The polyvinyl alcohol may include a foam depressor for spray application of said coating. Fluorocarbon and non-ionic surfactants are disclosed for providing a smooth coating surface and improving the transparency of said coating. A polyacrylate thickener may be included to facilitate applying the coating to vertical surfaces. Methylparaben is disclosed for preventing the formation of mold on said coating and improving shelf life of the coating. The method disclosed includes mixing an aqueous solution of polyvinyl alcohol, at least one surfactant and a foam depressor, applying said mixture to the surfaces of the paint spray booth to be protected and equipment located in the paint spray booth, and allowing the coating to dry to a crystal clear coating. Methods of removing the coating include peeling the coating off as a film and water washing the coating.

10 Claims, No Drawings

CLEAR PAINT BOOTH COATING COMPOSITION AND METHOD

BACKGROUND OF THE INVENTION

I. Technical Field

The present invention relates to a clear paint booth coating composition and method of applying the same to function as a barrier preventing the deposit of paint overspray on equipment and surfaces in a paint spray booth. The coating composition is dissolvable in water or may be peeled off as a film after overspray has accumulated thereon.

II. Brief Description of the Background Art

Paint spray booths are enclosures in which industrial production painting operations are performed. Paint spray booths both protect the paint spraying operation and permit control of emissions from paint spraying operations.

In commercial paint spraying processes, frequently as much as fifty percent of the paint used is not deposited on the object to be painted. Much of the overspray is removed in water wash systems used to scrub the overspray particles from exhaust air. However, some of the overspray is unavoidably deposited on robots, paint spraying equipment, transfer line carriers, paint booth walls and windows. If such objects and surfaces are not protected from the overspray, they can quickly become covered with paint. Paint deposits on robots and paint spray equipment can lead to equipment malfunctions or flaking off of paint on articles being painted which can adversely affect the quality of the painted article. Also, overspray build-up on walls and windows can diminish light levels in the paint spray booth and render windows useless.

The use of hot caustic or methylene chloride strippers to remove overspray suffers serious drawbacks in that the chemicals must be used carefully. Also, if methylene chloride-type strippers are used, the solvents contained in the strippers give off vapors which further burden plant emission control systems. Also, the emissions generated by paint removal operations contribute to the total amount of emissions permitted by environmental regulations and thereby reduce the quantity of emissions that may be generated in production painting operations.

The walls of paint spray booths may be protected by pigmented barrier coatings which are preferably white to make the paint booth brighter. Such pigmented coatings are not appropriate for use on equipment, robots or windows in paint spray booths since such coatings would obscure signs and windows.

Clear coatings are known for application to equipment, robots or windows in paint spray booths but have not been totally satisfactory in all respects. For example, xanthan gum-based clear barrier coatings are not resistant to ketone and aromatic solvents. Since such solvents are common in many paints, overspray particles may partially dissolve the barrier coating and allow some of the overspray to be deposited upon the objects and surfaces in the spray booth coated with the xanthan gum-based coating.

Another known type of clear coatings include urea formaldehyde-based barrier coatings which have better solvent resistance than xanthan gum coatings. However, urea formaldehyde-based coatings tend to have a yellow tint which is objectionable, particularly when applied to windows.

Combination xanthan gum and urea formaldehyde barrier coatings are known and result in a compromise coating which is not as yellow as urea formaldehyde coatings and not as seriously affected by ketone and aromatic solvents as xanthan gum barrier coatings.

Since the barrier coatings must be periodically removed and replaced with a fresh coating, it is vital that the coating be easily removable. Known clear coatings are normally removed in one of two ways, either by water washing or peeling off as a film.

With barrier coatings on equipment and robots, it is preferred to provide a peelable coating which may be removed without application of water that could harm the robots or equipment. On broad, flat surfaces that can be washed off with water or subjected to a high pressure water spray, it is generally preferred to wash the barrier coating off. The barrier coating if washed off must not interfere with the water wash system of the paint spray booth and must be compatible with the filtration or residue removal system used in the paint spray booth. Since known clear barrier coatings are limited to one preferred removal technique, it is generally necessary for optimal performance to use two different types of clear coating in a paint spray booth.

These and other disadvantages are overcome and problems are solved by the present invention's provision of an improved clear paint booth coating composition and method incorporating the use of such a compositions as summarized below.

SUMMARY OF THE INVENTION

According to the present invention, an aqueous solution is provided for forming a crystal clear barrier coating on objects and surfaces in paint spray booths which may be removed by either peeling or water washing. The aqueous solution includes polyvinyl alcohol as the primary constituent, a foam depressor for facilitating spray application and a wetting agent for facilitating application by a roller and providing a smooth, substantially transparent coating.

The aqueous solution may also include a polyacrylate or other thixotropic agent for thickening the solution which is particularly important when applying the coating to vertically oriented surfaces. Also, a preservative additive may be included in the solution for preventing discoloration of the coating after application and improving product shelf life.

A preferred composition of the present invention essentially comprises an aqueous solution of: Elvanol 52-22, a trademark of E. I. DuPont deNemours & Co. for polyvinyl alcohol; triethanolamine, an amine neutralizer and corrosion inhibitor; Colloid 513, a proprietary product available from Colloids, Inc. and identified by that trademark; Fluorad FC 100, a fluorocarbon surfactant available from 3M Company and identified by that trademark; Carbopol 941, a proprietary polyacrylate thickener available from B. F. Goodrich and identified by that trademark; and Methylparaben, a non-toxic preservative.

The preferred constituents and broad and preferred ranges of constituents of the coating composition are set forth below in the following table.

| Name of raw material | Generic Description | Preferred Range % by Weight | Broad Range % by Weight |
|---|---|---|---|
| Elvanol 52-22 | Polyvinyl Alcohol | 5–10% | 5–20% |
| Triethanolamine 85% | Amine Neutralizer as a Corrosion Inhibitor | 1–2% | 0–5% |
| Colloid 513 | Foam Depressor | 0–0.3% | 0–1% |
| Fluorad FC 100 | Fluorocarbon Surfactant | 0.02–0.1% | 0–0.5% |
| Carbopol 941 | Polyacrylate Thickener | .1–.3% | 0–1% |
| Methylparaben | Preservative | 0.1–1% | 0–2% |
| Water | | 85–90% | 75–95% |

The method of providing a barrier coating on equipment and surfaces in paint spray booths comprises the steps of mixing water, preferably hot, with at least one surfactant and a foam depressor. Polyvinyl alcohol is then slowly sifted into the mixture while mixing at low speed to prevent the mixture from gelling. Finally, a polyacrylate is added to thicken the solution. The above solution is applied by spraying, rolling or otherwise coating paint spray booth surfaces and equipment located in paint spray booths. The coating is then dried to form a crystal clear coating thereon.

The method further includes suitable removal techniques including either peeling the barrier coating off of the substrate or water washing the barrier coating from the surfaces and objects after sufficient overspray paint has been deposited thereon.

If the objects coated are part transfer apparatus that are subsequently exposed to paint ovens wherein the paint overspray is thermally cured in the ovens on the barrier coating, it may be necessary to use a water blaster wherein water is sprayed at high pressures on the barrier coated apparatus to remove the barrier coating.

The barrier coating of the present invention is advantageous in that a solvent-based paint remover is not required to remove the barrier coating or overspray from the equipment or interior paint spray booth surfaces. Since a solvent-based paint remover is not needed, lower solvent emission levels may be achieved by the manufacturing plants. Also, the barrier coating and materials required to remove the barrier coating are both non-toxic and non-flammable and are therefore safer to use.

The barrier coating of the present invention is not affected by ketone and aromatic solvents and provides an effective barrier to paints having such solvents.

The equipment and robots coated by the crystal clear barrier coating of the present invention may be stripped by peeling the coating off in a film form. The coating may also be applied to hoses because it is flexible and will not flake off of flexible hoses as they are used in paint spraying operations.

The crystal clear barrier coating of the present invention is especially suitable for coating glass incorporated in the walls of some paint spray booths. When applied to glass, the coating is substantially smooth and transparent. If properly applied, the coating will not run or streak and if the coating includes a preservative, it resists the formation of mold or other discoloration.

These and other advantages of the present invention will become more apparent upon studying the following detailed description and claims.

DETAILED DESCRIPTION OF THE INVENTION

The clear paint spray booth coating of the present invention comprises an aqueous solution of polyvinyl alcohol in the range of 5 to 10% by weight, an amine neutralizer and corrosion inhibitor in the amount of 1 to 2% by weight, a foam depressor in the amount of 0 to 0.3% by weight and a wetting agent, or fluorocarbon surfactant, in the amount of 0.02 to 0.1% by weight. The solution may include a polyacrylate thickener in the amount of from 0 to 1% by weight. The solution may also include a preservative in the amount of 0 to 2% by weight.

The polyvinyl alcohol of the present invention is preferably Elvanol 52-22, a registered trademark of DuPont Company for its polyvinyl alcohol. Elvanol is a solid form, powder composition.

The preferred neutralizing agent and corrosion inhibitor is triethanolamine $(HOCH_2CH_2)_3N$. Triethanolamine is a colorless, viscous liquid which is miscible with water and effective to prevent foaming in the coating when the coating is applied by spraying.

The preferred foam depressor is Colloid 513, a proprietary product sold by Colloids, Inc. under the above trademark.

One or more surfactants may be included in the composition to wet the surface to be coated and act as a levelling agent to assure a smooth and substantially transparent crystal clear coating. A fluorocarbon surfactant such as Fluorad FC-100, a trademark of 3M Company, may be used alone in the product or combined with a non-ionic surfactant.

A thickener, such as Carbopol 941, a polyacrylate thickener, may be used to control the viscosity of the solution and facilitate application of the coating to vertical surfaces. Carbopol 941 is a trademark of B. F. Goodrich Company.

A preservative such as Methylparaben $(C_8H_8O_3)$ may also be included in the solution. Methylparaben is an effective non-toxic preservative.

The preferred composition of the present invention is as follows:

| | |
|---|---|
| Elvanol 52-22 | 8% by weight |
| Triethanolamine | 1.5% by weight |
| Colloid 513 | .15% by weight |
| Fluorad FC 100 | 0.05% by weight |
| Carbopol 941 | .1% by weight |
| Methylparaben | .2% by weight |
| Water | Balance |

The solution is prepared by mixing in hot water all of the constituents except the polyvinyl alcohol and the polyacrylate. The polyvinyl alcohol is then sifted into the solution while mixing continues at a low speed to prevent gelling and is continued until all of the polyvinyl acrylate is dissolved. The polyacrylate is then added as the final constituent and is thoroughly intermixed in the solution. The following exemplary compositions have been tested in field tests wherein the coatings were applied to equipment and surfaces in paint spray booths. Performance of the various coatings was evaluated by observing the effectiveness as a barrier, appearance, durability, and ease of application and removal of the coatings.

EXAMPLE 1

| | |
|---|---|
| Elvanol 52-22 | 8% by weight |
| Triethanolamine | 1.5% by weight |
| Colloid 513 | 0.15% by weight |
| Fluorad FC 100 | 0.05% by weight |
| Carbopol 941 | 0.1% by weight |
| Methylparaben | 0.2% by weight |
| Water | Balance |

The above coating composition was applied by both air and airless sprayers and by paint rolling application methods. The composition was removable by peeling, water blasting and simple water washing. The preferred method of application was by airless spray or by manual roll coating. A high quality coating was obtained on all surfaces, even the most critical application on windows. The coating may be easily peeled from glass and may be removed from paint hoses with warm water applied with a cloth. Any residue left behind after peeling was easily removed by wiping with water and cloth.

EXAMPLE 2

| | |
|---|---|
| Elvanol 52-22 | 7.5% by weight |
| Colloid 513DD | 0.2% by weight |
| Sulframin 90* | 0.05% by weight |

*A trademark for a proprietary surfactant sold by Allied Chemical.

The above example, when tested, foamed excessively when sprayed and resisted peeling removal. The above coating appeared hazy when applied to glass and was not acceptable.

EXAMPLE 3

| | |
|---|---|
| Elvanol 52-22 | 7.75% by weight |
| Pluronic L-61* | 0.1% by weight |
| Sulframin 90 | 0.1% by weight |
| Water | Balance |

*A trademark for a proprietary surfactant sold by BASF Wyandotte Chemical Co.

The above coating did not peel completely and had an oily surface that was not preferred.

EXAMPLE 4

| | |
|---|---|
| Elvanol 52-22 | 7.75% by weight |
| Pluronic L-61 | 0.1% by weight |
| Sulframin 90 | 0.1% by weight |
| Borax (Sodium Borate) | 0.03% by weight |
| Water | Balance |

The above coating composition had excessive viscosity and was inappropriate for spray application.

EXAMPLE 5

| | |
|---|---|
| Elvanol 52-22 | 8% by weight |
| Triethanolamine 85% | 1.5% by weight |
| Tergitol 15-S-3* | 1.5% by weight |
| Sulframin 90 | 0.08% by weight |
| Borax | 0.02% by weight |
| Water | Balance |

*A trademark for a proprietary surfactant sold by Union Carbide.

The above composition was acceptable in terms of peeling and water wash removal techniques but was too thick for easy spray application. The product also became cloudy after several days as a result of the formation of mold on the coating.

EXAMPLE 6

| | |
|---|---|
| Elvanol 52-22 | 10% by weight |
| Triethanolamine 85% | 1% by weight |
| Surfactant | .2% by weight |
| Water | Balance |

The above coating would be acceptable for application by roll coating but is not expected to be acceptable as a spray application material. Also, the coating thickness achievable would be limited due to the lack of a thickening agent and the material would probably become cloudy after a period due to the lack of an effective preservative.

EXAMPLE 7

| | |
|---|---|
| Elvanol 52-22 | 5% by weight |
| Tergitol 15-S-3 | 0.2% by weight |
| Water | Balance |

The above example would be acceptable for roll coating application. The above solution would foam excessively without a foam depressor, could only be applied in a thin coat since it lacks a thickener, and would cause flash rust on exposed mild steel since it lacks a corrosion inhibitor. It is anticipated that the above composition would also suffer from the lack of a preservative as noted with regard to Example 7 above.

The above description of a new, improved crystal clear paint spray booth coating is intended as an example and not in a limiting sense. It will be appreciated that constituent materials and proportions given above may be modified without departing from the spirit and scope of the invention. The scope of the invention is to be determined based upon the full scope of the following claims and all equivalents thereof.

We claim:

1. An aqueous solution for forming crystal clear coating on paint booth surfaces and equipment located in paint spray booths, said coating being removable with water or peelable from a substrate as a film comprising the following constituents:
   from about 5 to 20% by weight of polyvinyl alcohol;
   from about 1 to 5% by weight of a foam depressor;
   from about 0.07 to 0.7% by weight of a wetting agent;
   and an amine neutralizer and corrosion inhibitor in an amount of up to 1% by weight.

2. The aqueous solution of claim 1, wherein said amine neutralizer and corrosion inhibitor comprise triethanolamine.

3. The aqueous solution of claim 1, and a preservative 0.1 to 2% by weight.

4. The aqueous solution of claim 1, wherein said wetting agent is a fluorocarbon surfactant of up to 0.5% by weight.

5. The aqueous solution of claim 4, and a non-ionic surfactant.

6. The aqueous solution for forming crystal clear coating on paint booth surfaces and equipment located in paint spray booths, said coating being removable with water or peelable from a substrate as a film comprising the following constituents:
   from about 5 to 10% by weight of polyvinyl alcohol;
   from about 1 to 2% by weight of a foam depressor;
   from about 0.07 to 0.3% by weight of a wetting agent;
   and an amine neutralizer and corrosion inhibitor in the amount of up to 1% by weight.

7. The aqueous solution of claim 6, wherein said amine neutralizer and corrosion inhibitor comprise triethanolamine.

8. The aqueous solution of claim 6, wherein said wetting agent is a fluorocarbon or surfactant of up to 0.5% by weight.

9. The aqueous solution of claim 8, and a non-ionic surfactant.

10. A method of providing a barrier coating on a paint spray booth and equipment located in a paint spray booth comprising applying to surfaces of the paint spray booth or the equipment located in said spray booth, the aqueous solution of claim 1.

* * * * *